(12) United States Patent
Hara et al.

(10) Patent No.: US 9,165,365 B2
(45) Date of Patent: Oct. 20, 2015

(54) METHOD AND SYSTEM FOR ESTIMATING ATTITUDE OF CAMERA

(71) Applicant: DENSO WAVE INCORPORATED, Chita-gun, Aichi-pref. (JP)

(72) Inventors: Kosuke Hara, Yamato (JP); Koji Kamiya, Anjo (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 103 days.

(21) Appl. No.: 14/097,800

(22) Filed: Dec. 5, 2013

(65) Prior Publication Data
US 2014/0169636 A1    Jun. 19, 2014

(30) Foreign Application Priority Data
Dec. 5, 2012 (JP) ................................ 2012-266465

(51) Int. Cl.
*G06T 7/00* (2006.01)
*G06T 19/00* (2011.01)

(52) U.S. Cl.
CPC ............ *G06T 7/0042* (2013.01); *G06T 7/0018* (2013.01); *G06T 2207/10028* (2013.01); *G06T 2207/30204* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 7,362,969 B2* | 4/2008 | Aliaga et al. | ................... | 396/429 |
| 7,911,503 B2* | 3/2011 | Kobayashi | ................ | 348/222.1 |
| 2004/0239756 A1* | 12/2004 | Aliaga et al. | .................... | 348/36 |
| 2005/0234333 A1* | 10/2005 | Takemoto et al. | ............ | 600/426 |
| 2008/0292131 A1* | 11/2008 | Takemoto et al. | ............ | 382/100 |
| 2010/0045701 A1* | 2/2010 | Scott et al. | .................... | 345/633 |
| 2011/0063403 A1* | 3/2011 | Zhang et al. | ................ | 348/14.1 |

\* cited by examiner

*Primary Examiner* — Vu Le
*Assistant Examiner* — Alexander J Lesnick
(74) *Attorney, Agent, or Firm* — Oliff PLC

(57) ABSTRACT

In a method of estimating a camera attitude, based on the past-detected position of a marker and an appropriate camera attitude provided during current frame imaging, the position of the maker to the current frame is approximately predicted. Through extraction of points which are near the predicted marker position (marker neighboring points), a group of points are obtained. An attitude of the camera (rotation matrix and translation matrix) which optimizes an estimation function is obtained for re-estimating the camera attitude, where the estimation function needs, as its condition, a distance between the marker neighboring points included in the point groups and an estimation plane on which the marker is positioned. The point groups include many points extracted from the neighborhood of the marker, so that the preliminarily estimated approximate camera attitude can be corrected and estimated with higher accuracy even in an environment with occlusion.

7 Claims, 3 Drawing Sheets

RECTANGULAR MARKER

METHOD AND SYSTEM FOR ESTIMATING ATTITUDE OF CAMERA

CROSS-REFERENCE TO RELATED APPLICATION

This application is based on and claims the benefit of priority from earlier Japanese Patent Application No. 2012-266465 filed on Dec. 5, 2012, the description of which is incorporated herein by reference.

BACKGROUND OF THE INVENTION

1. Technical Field of the Invention

The present invention relates to a method and a system for estimating an attitude of a camera.

2. Related Art

In recent years, mobile devices having a large amount of processing for computing power, such as smartphones, have become rapidly popular. Most of these information terminals include a camera as an imaging device. The information terminals provide communication features that simply use audio information and text information. In addition, the information terminals also include communication features that use image information. In accompaniment with the growing popularity of such mobile devices, users are becoming increasingly familiar with technology referred to as augmented reality (AR) and technology for restoring a three-dimensional shape of a subject from captured images. In AR technology, for example, when an image of a target object is captured by the camera in the information terminal, a comment related to the target object is superimposed on the image and displayed. For example, the following non-patent reference 1 reports a method for three-dimensional measurement using a red, green, blue, and depth (RGB-D) camera.

In technologies such as those described above, calibration of a coordinate system of an environment captured in a two-dimensional image and a coordinate system of an actual environment is performed. To perform the calibration, the position and the attitude of the user (camera) is required to be known.

Therefore, in the field of AR technology, a following method is proposed. In the method, a marker of which the position, shape, and color are already known is disposed in advance in the actual environment. An image of the marker is captured by the camera. The attitude of the camera is then estimated by the image being analyzed. Since the past, a rectangular marker has often been used as such a marker (for example, refer to the following non-patent reference 2).

[Non-patent reference 1] Lieberknecht S., Huber A., Ilic S., Benhimane S., "RGB-D Camera-based Parallel Tracking and Meshing," The 10th IEEE and ACM International Symposium on Mixed and Augmented Reality, October 26-29 (2011)

[Non-patent reference 2] Kato, et al., "An Augmented Reality System and its Calibration based on Marker Tracking," Journal of the Virtual Reality Society of Japan, Vol. 4, No. 4, pp. 607-616 (1999))

To calculate the attitude of the RGB-D camera using the marker, first, the rectangular area of the marker is recognized by the RGB-D camera. Then, the camera attitude is estimated using the coordinates of the apexes of the rectangle.

However, three-dimensional space has a front/back relationship in addition to the two-dimensional relationships that are up/down and left/right. Therefore, a state occurs in which an object that is present in front hides a subject that is behind it. This state is referred to as occlusion. In an environment having numerous cables and components, these cables and components cause occlusion to occur at numerous perspectives. When a portion of the marker is hidden as a result of occlusion, detection of the rectangular area becomes difficult. Accurate estimation of the camera attitude becomes difficult.

SUMMARY

SUMMARY OF THE INVENTION

Hence is desired to provide a method for enabling estimation of a camera attitude with high accuracy even in an environment in which occlusion occurs, and a system for performing the method.

As one aspect, there is provided a method for estimating a camera attitude according to an exemplary embodiment. The camera is capable of acquiring an intensity image and a depth image. The method includes: a step of collecting information on images captured by the camera in an environment in which a planar marker is disposed; a step of calculating a position of the planar marker from images in which the planar marker is captured without occlusion; a step of extracting localized feature points for calculating a camera attitude for each frame from the intensity image and the depth image of each frame acquired by imaging; a step of performing association between the extracted feature points, one-to-one between frames, based on a distance between descriptors; a step of estimating an approximate camera attitude during imaging of a specified frame in which a marker hidden by an occlusion is captured, based on the association between the feature points; a step of predicting an approximate position of the marker in relation to the specified frame based on the position of the marker and the approximate camera attitude; a step of converting a three-dimensional point included in the depth image of the specified frame to a world coordinate system using the approximate camera attitude, and extracting a point group within a predetermined distance from the predicted approximate position of the marker; and a step of re-estimating the camera attitude during imaging of the specified frame by determining a camera attitude that optimizes an evaluation function of which a condition is a distance between marker neighboring points included in the point group and an estimation plane on which the marker is positioned.

In addition, as another aspect, there is provided a system for estimation of a camera attitude by performing the method according to the above. The system includes a camera that captures images of an actual environment in which a planar marker is disposed, and a computer that performs processing of the images captured by the camera. The camera is capable of acquiring an intensity image and a depth image. The computer includes a calculating section that performs steps included in the method.

In the method for estimating a camera attitude, first, based on a position of the marker that has been previously detected and an approximate camera attitude during imaging of the current frame, an approximate position of the marker in relation to the current frame is predicted. A point group is determined by points (marker neighboring points) present near the predicted marker position being extracted.

Then, a camera attitude (rotation matrix and translation matrix) that optimizes an evaluation function of which a condition is the distance between a marker neighboring point included in the point group and an estimation plane on which the marker is positioned is determined. As a result, the camera attitude is re-estimated.

The point group includes a significantly large number of points that have been extracted from near the marker. Therefore, estimation of the camera attitude can be performed with significantly high accuracy.

DETAILED DESCRIPTION OF THE PREFERRED EMBODIMENTS

A method and a system for estimating an attitude of a camera of the present invention will be described with reference to the drawings.

As described above, three-dimensional space has a front/back relationship in addition to the two-dimensional relationships that are up/down and left/right. Therefore, a state occurs in which an object that is present in front hides a subject that is in the back. When a portion of a marker is hidden as a result of occlusion, detection of a rectangular area becomes difficult. Accurate estimation of the camera attitude becomes difficult.

Therefore, first, based on a position of the marker that has been previously detected and an approximate camera attitude during imaging of a current frame, an approximate position of the marker in relation to the current frame is predicted. A point group is determined by points (marker neighboring points) present near the predicted marker position being extracted.

The points included in the point group can be considered to be a part of the marker. However, in an instance in which the marker is a plane, these points should be on the same plane as the point group of the marker that has been previously detected. Therefore, a distance from a marker neighboring point included in the point group to the plane on which the marker is positioned can be considered to be an estimation error between the approximate camera attitude and the true camera attitude.

Based on this knowledge, in the present invention, an evaluation function (cost function) is defined. A condition of the evaluation function is the distance from t the marker neighboring point included in the point group to the marker plane. The camera attitude is re-estimated by the attitude of the camera (rotation matrix and translation matrix) that optimizes the evaluation function being determined. The point group includes a very large number of points extracted from near the marker. Therefore, the camera attitude can be estimated with very high accuracy.

Figure 1:
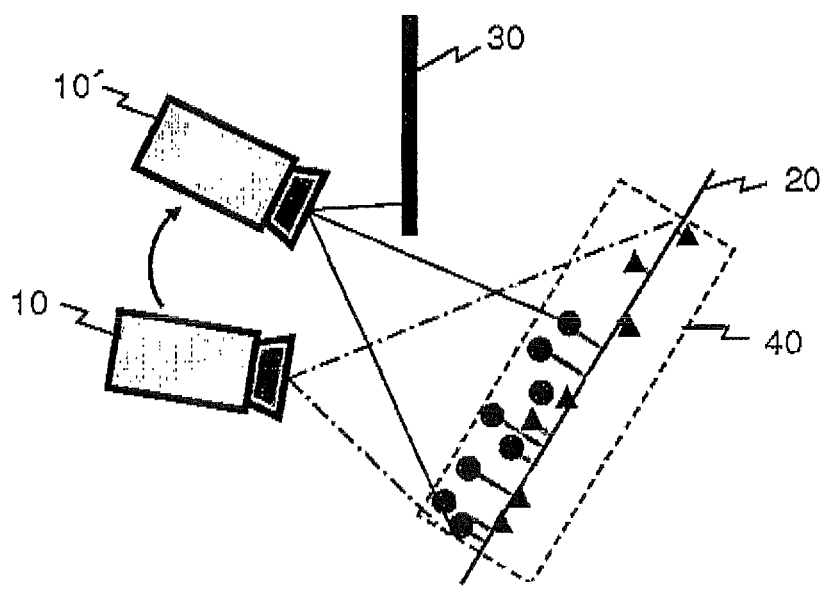
FIG. 1 is a conceptual diagram for facilitating understanding of a method for estimating camera attitude of the present invention.

FIG. 1 is a diagram of a conceptual system for facilitating understanding of the method for estimating an attitude of a camera according to an embodiment of the present invention. The camera is attached to, for example, the arm of an industrial robot.

In FIG. 1, reference numbers 10 and 10' each represent a camera. The attitudes of the cameras 10 and 10' differ. Reference number 20 represents a plane on which the marker is positioned (estimation plane). Reference number 30 represents an occlusion. Reference number 40 represents a judgment area (described hereafter) for extracting points near the marker. Triangular symbols in FIG. 1 indicate a point group of a marker area in a previously captured image. Circular symbols indicate a point group (a point group selected from near the previous marker area) of a marker area in an image that has been newly captured. In the present invention, a distance between the point group and the marker plane (estimation plane) is considered to be an "error" in the camera attitude.

Figure 2:
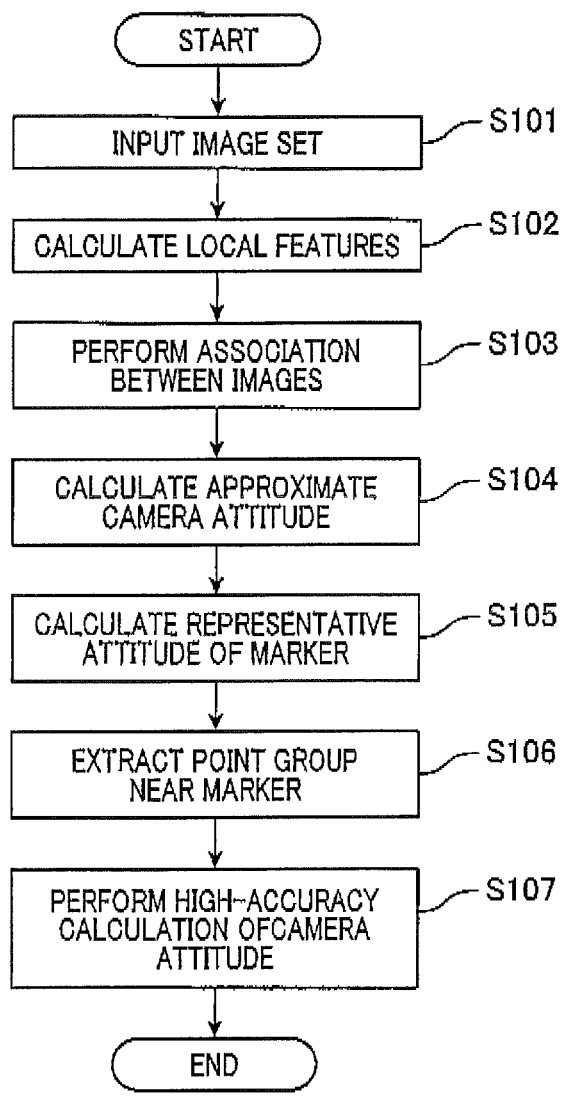
FIG. 2 is a flowchart for describing the steps in an example of the method for estimating camera attitude of the present invention.

FIG. 2 is a flowchart for explaining the steps in an example of the method for estimating an attitude of a camera of the present invention. The steps are performed by, for example, a computer (central processing unit [M]).

Details of processing performed at each step will be described hereafter.

[Input Image Set] (Step S101)

First, in an environment in which the planar marker is disposed, a plurality of images (N images) are captured from different camera attitudes. The images are then inputted into the computer. The marker is merely required to be capable of allowing the camera attitude to be accurately determined from an image. In the description hereafter, the marker is assumed to be a rectangular marker that is often used in AR.

Here, the camera used to capture images herein is a camera capable of acquiring an intensity image and a depth image. Here, the camera is an RGB-D camera that is capable of acquiring RGB intensity information for each pixel and distance information on the distance to a subject. In other words, as a result of imaging by the RGB-D camera, the RGB intensity information for each pixel and distance information on the distance to the subject are acquired from the plurality of images captured of the disposed marker. A collection of these images is φ, below.

$$\Phi = \{1, \ldots, N\} \quad \text{[Formula 1]}$$

The RGB-D camera is, for example, KINECT (manufactured by Microsoft) (registered trademark) or XTION Pro LIVE (manufactured by ASUS) (registered trademark). An RGB camera and a depth camera are fixed to these cameras. When calibration is performed of the relative positional attitudes of the RGB camera and the depth camera, the RGB intensity value for each pixel and the information on the so distance to the subject can be acquired.

[Calculate Local Features] (Step S102)

Local features for determining an approximate camera attitude are calculated from the images included in the image collection φ. An algorithm for calculating such local features is, for example, scale-invariant feature transform (SIFT) or speeded up robust features (SURF). Taking image k for example, a three-dimensional position $M_k$ and a descriptor $D_k$ are obtained as described below for an $I_k$-number of feature points. In other words, the RGB intensity information and the distance information on the distance to the subject are extracted from the above-described plurality of images.

$$M_k = \{m_i^k | i=1, \ldots, I_k\}, m_i^k = [m_{x,i}^k, m_{y,i}^k, m_{z,i}^k]^T \quad \text{[Formula 2]}$$

$$D_k = \{d_i^k | i=1, \ldots, I_k\} \quad \text{[Formula 3]}$$

[Perform Association Between Images] (Step S103)

Next, association is performed between feature points included in a single image among the plurality of images and feature points included in another image. The association is performed between extracted feature points, one-to-one between images, based on distance in feature quantity space. In an instance in which a feature point i included in the image k and a feature point j included in an image h indicate the same point in an environment, the distance D ($d_i^k, d_j^h$) between descriptors of the local features calculated at Step S102 becomes small. Therefore, as a result of thresholding of the distance D between descriptors, feature points in differing images can be associated with each other. Association of the feature points in the image collection $\phi$ is placed as in $\psi$, below. However, association is not performed between the same feature points and in the same image.

$$\Psi = \{i,j,k,h) | D(d_i^k, d_j^h) < \text{threshold}, i \in D_k, j \in D_h, k \neq h, k \in \Phi, h \in \Phi\} \quad \text{[Formula 4]}$$

[Calculate Approximate Camera Attitude] (Step S104)

Here, an approximate camera attitude of when the image k is captured is placed at ($R_c^k$, $t_c^k$). $R_c^k$ is a rotation matrix. $t_c^k$ is a translation matrix.

A cost function $E_I$ is defined as follows. The approximate camera attitude ($R_c^k$, $t_c^k$) is determined such as to minimize the cost function $E_I$.

$$E_I = \sum_{(k,h,i,j) \in \Psi} (\varepsilon_{ij}^{kh})^T (\varepsilon_{ij}^{kh}) \quad \text{[Formula 5]}$$

Here, $\epsilon_{ij}^{hk}$ is defined as follows.

$$\varepsilon_{ij}^{kh} = \begin{bmatrix} \varepsilon_{x,ij}^{kh} \\ \varepsilon_{y,ij}^{kh} \\ \varepsilon_{z,ij}^{kh} \end{bmatrix} = v_i^k - v_j^h \quad \text{[Formula 6]}$$

$$v_i^k = R_C^k m_i^k + t_C^k \quad \text{[Formula 7]}$$

The above-described $\epsilon_{ij}^{hk}$ is a difference between the coordinates of associated feature points. Therefore, the approximate camera attitude ($R_c^k$, $t_c^k$) at which the image k has been captured is estimated from the cost function $E_I$ obtained from the difference between the coordinates of the associated feature points.

Calculation for minimization of the cost function $E_I$ is performed by a non-linear optimization method. For example, the Levenberg-Marquardt method can be used. During this calculation, robust estimation for preventing erroneous corresponding points is introduced. The robust estimation is, for example, M-estimator (robust estimation) or random sample consensus (RANSAC). However, because these methods are commonly used, descriptions thereof are omitted herein.

The accuracy of the approximate camera attitude ($R_c^k$, $t_c^k$) obtained by the above-described procedures is dependent on the number of associated feature points per image. Accuracy becomes poor if the number of associated feature points is small. In general, the number of associated feature points is several tens per image. Therefore, estimation of the camera attitude with high accuracy is often difficult.

Therefore, the camera attitude at which the image k has been captured is re-estimated by the following procedures. Points near the marker detected in the image k are extracted as a point group based on the approximate camera attitude. The evaluation function of which a condition is the distance from a marker neighboring point included in the point group to the plane on which the marker is positioned, is optimized.

[Calculate Representative Attitude of Marker] (Step S105)

The marker is captured in a plurality of images. Therefore, a representative position (representative attitude) of the marker is determined by calculation. A collection Ξ placing an R-number of markers in the environment is placed as follows. An identifier (ID), from 1 to R, is set for each marker. The ID allows identification by texture.

$$\Xi = \{1, \ldots, R\} \quad \text{[Formula 8]}$$

Taking marker r as an example, a representative position of the marker r is determined. The attitude of the marker captured in the image and the marker ID can be determined by a known method.

For example, apex coordinates (camera coordinate system) of the rectangular marker when the marker r is detected in the image k is placed as in $Q^{k,r}$ below.

$$Q^{k,r} = \{q_\lambda^{k,r} | \lambda = 1, \ldots, 4\}$$

$$q_\lambda^{k,r} = [q_{x,\lambda}^{k,r}, q_{y,\lambda}^{k,r}, q_{z,\lambda}^{k,r}]^T \quad \text{[Formula 9]}$$

As shown in FIG. 3, 1 to 4 of the subscript λ, above, expresses the numbers of the four apexes of the rectangular marker.

When the rectangle size of a marker model expressing the true shape of the marker is 2θ (mm), the coordinates of the apexes can be expressed by the following expressions.

$$\bar{q}_1 = [-\theta, 0, \theta]^T$$

$$\bar{q}_2 = [-\theta, 0, -\theta]^T$$

$$\bar{q}_3 = [\theta, 0, -\theta]^T$$

$$\bar{q}_4 = [\theta, 0, \theta]^T \quad \text{[Formula 10]}$$

To calculate a representative position $W^r$ of the marker, coordinates ($R_m^r$, $t_m^r$) that minimize the cost function $E_1$, below, are determined.

$$E_M^r = \sum_k \sum_\lambda (e_\lambda^{k,r})^T (e_\lambda^{k,r}) \quad \text{[Formula 11]}$$

$$e_\lambda^{k,r} = (R_C^k q_\lambda^{k,r} + t_C^k) - (R_M^r \bar{q}_\lambda + t_M^r)$$

Calculation for minimization of the cost function $E_M^r$ can be performed by a non-linear optimization method or a linear optimization method. For example, the Levenberg-Marquardt method can be used.

When the coordinates ($R_M^r$, $t_M^r$) are determined, the representative position $W^r$ of the marker can be calculated as follows.

$$W^r = \{R_M^r \bar{q}_\lambda + t_M^r | \lambda = 1, \ldots, 4\} \quad \text{[Formula 12]}$$

[Extract Point Group Near Marker] (Step S106)

All three-dimensional points $Y_k$ of the depth image of the image k are placed as described below. In other words, all three-dimensional points $h_m^k$ included in the depth image of the image k are determined.

$$h_m^k = [h_{x,m}^k, h_{y,m}^k, h_{z,m}^k]^T m \in Y_k \quad \text{[Formula 13]}$$

Next, a collection of the point groups of coordinate points near the marker is determined and set by a following procedure.

$$\Omega=\{(k,m,r)|b(f_m^k,W^r)=\text{true},f_m^k=R_C^k h_m^k+t_C^k, m\in Y_k, r\in\Xi, k\in\Phi\}$$ [Formula 14]

A point $f_m^k$ is determined by the following expression. The point $f_m^k$ is the three-dimensional point $h_m^k$ of the depth image of the image k converted to a shared coordinate system (world coordinate system) between frames, using the approximate camera attitude determined as described above.

$$f_m^k=R_C^k h_m^k+t_C^k$$ [Formula 15]

A function $b(f_m^k, W^r)$ used to determine the collection of point groups returns "true" when $f_m^k$ is near the marker. The function $b(f_m^k, W^r)$ returns "false" when $f_m^k$ is not near the marker.

Figure 4:
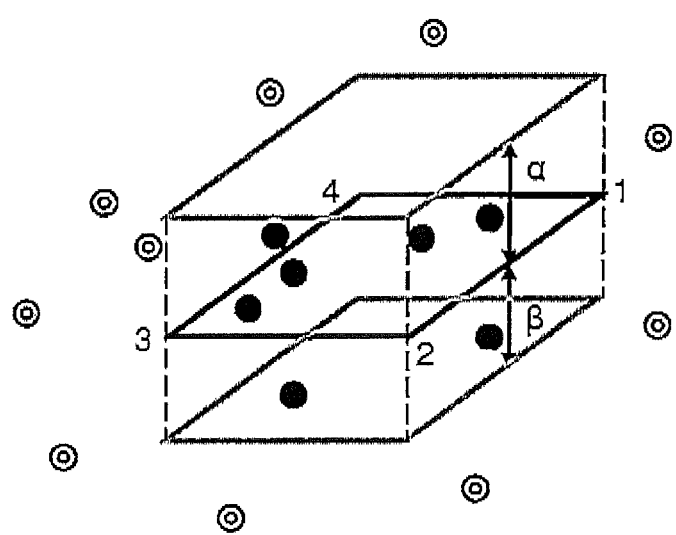
FIG. 4 is a diagram for explaining an area used to judge whether or not a point $f_m^k$ is near the marker, the point $f_m^k$ being a three-dimensional point $h_m^k$ of a depth image of an image k converted to a common coordinate system (world coordinate system).

FIG. 4 is a diagram for explaining an example of a judgment area for judging whether or not $f_m^k$ is near the marker.

Figure 3:
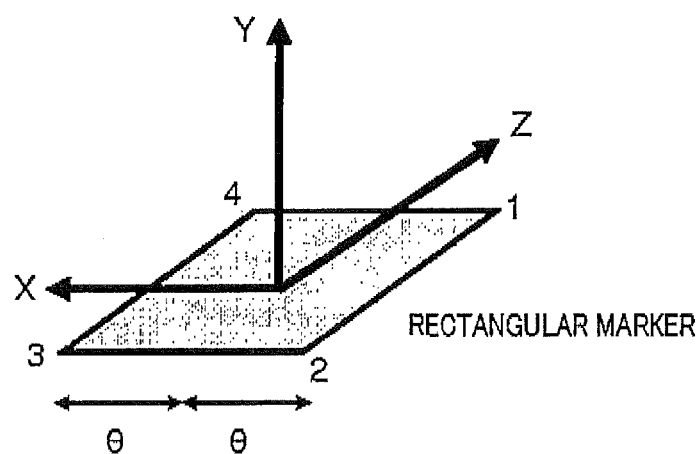
FIG. 3 is a diagram for explaining numbers of four apexes of a rectangular marker and size 2θ of the rectangular marker.

In the example shown in FIG. 3, a rectangular parallelepiped area that is the rectangle $W^r$ of the marker r expanded by a (mm) in the normal direction of the marker plane and 13 (mm) in the direction opposite of the normal is the judgment area. The three-dimensional point $h_m^k$ within the rectangular parallelepiped area is determined to be "true" and is extracted as a point configuring the marker area point group. The three-dimensional point $h_m^k$ outside of the rectangular parallelepiped area is determined to be "false" and is not extracted as the point group.

[Perform High-Accuracy Calculation of Camera Attitude] (Step S107)

The cost function of the marker area point group is added to the above-described cost function $E_I$, and a new cost function $E_F$ is defined.

$$E_F = \sum_{(k,h,i,j)\in\Psi} (\varepsilon_{ij}^{kh})^T(\varepsilon_{ij}^{kh}) + \eta \sum_{(k,r,m)\in\Omega} (\delta_m^{k,r})^2$$ [Formula 16]

$$\varepsilon_{ij}^{kh} = \begin{bmatrix} \varepsilon_{x,ij}^{kh} \\ \varepsilon_{y,ij}^{kh} \\ \varepsilon_{z,ij}^{kh} \end{bmatrix} = v_i^k - v_j^h$$ [Formula 17]

$$v_i^k = R^k m_i^k + t^k$$ [Formula 18]

$$\delta_m^{k,r} = -n_r^T(R^k h_m^k + t^k) - d_r$$ [Formula 19]

The symbols $n_r^T$ and $d_r$ in the functional expressions above indicate parameters of a plane to which the marker area point group belongs.

A camera attitude $(R^k, t^k)$ and plane parameters that minimizing the cost function $E_F$ are determined.

In other words, the sum of a second cost function obtained from the points extracted as the marker area point group and a first cost function $E_I$, described above, are re-defined as the cost function $E_F$. The camera attitude of when the image k is captured is estimated from the cost function $E_F$.

Calculation for minimization of the cost function $E_F$ can be performed by the non-linear optimization method. For example, the Levenberg-Marquardt method can be used. During this calculation, robust estimation for preventing erroneous corresponding points is introduced. The robust estimation is, for example, M-estimator (robust estimation) or random sample consensus (RANSAC). However, because these methods are commonly used, descriptions thereof are omitted herein.

A cost function (second item) regarding the marker area point group is added to cost function $E_F$. The cost function of the second item includes information from several tens of thousands of three-dimensional points included in the marker area point group.

As a result, the camera attitude $(R^k, t^k)$ obtained by calculation for minimization of the cost function $E_F$ has a significantly higher accuracy than the camera attitude $(R_c^k, t_c^k)$ obtained by the calculation for minimization of the cost function $E_I$.

A coefficient $\eta$ of a second item of the cost function $E_F$ is a positive value. The balance between the local features and the marker area point group is adjusted. When the marker area is disposed such as to be localized in the environment, estimation accuracy of the camera attitude may be decreased if the effect of the marker area is too strong. To equalize the effect of the local features and the effect of the point group of the marker area, the coefficient $\eta$ is defined by a following expression.

$$\eta=3|\Psi|/|\Omega|$$ [Formula 20]

As described above, in the method for estimating a camera attitude of the present invention, first, based on the position of the marker that has been previously detected and the approximate camera attitude during imaging of the current frame, the approximate position of the marker in relation to the current frame is predicted. Points (marker neighboring points) near the predicted marker position are determined as a point group. A camera attitude (rotation matrix and translation matrix) that optimizes the evaluation function is determined, where the evaluation function conditions the distance between the marker neighboring point included in the point group and the estimation plane on which the marker is positioned. By this determination, the camera attitude can be re-estimated.

As a result of the above-described optimization of the evaluation function, the camera attitude that has been estimated in advance is corrected. Estimation of the camera attitude can be performed with high accuracy even in an environment in which occlusion occurs.

Estimation of the camera attitude such as this can be performed at high speed using a system that includes a camera and a computer. The camera captures images of an actual environment in which the planar marker is disposed. The computer performs processing of the images captured by the camera. The above-described steps can be processed by calculation by the computer.

INDUSTRIAL APPLICABILITY

The present invention can provide a method for enabling estimation of a camera attitude with high accuracy even in an environment in which occlusion occurs, and a system for performing the method.

What is claimed is:

1. A method of estimating an attitude of a camera, wherein the camera acquires an intensity image and a depth image, the method comprising steps of:
collecting information about images captured by the camera in an environment in which a planar marker is disposed;
determining a position of the planar marker from images in which the planar marker is captured without occlusion;
extracting localized feature points for calculating the attitude of the camera for each frame from the intensity image and the depth image of each frame acquired by imaging;
performing association between the extracted feature points, one-to-one between frames, based on a distance between descriptors;

estimating an approximate attitude of the camera during imaging of a specified frame in which a marker hidden by an occlusion is captured, based on the association between the feature points;

predicting an approximate position of the marker in relation to the specified frame based on the position of the marker and the approximate camera attitude;

extracting point groups within a predetermined distance from the predicted approximate position of the marker, through converting a three-dimensional point included in the depth image of the specified frame to a world coordinate system using the approximate attitude of the camera; and re-estimating the attitude of the camera during imaging of the specified frame by determining a camera attitude that optimizes an evaluation function conditioning a distance between a marker neighboring point included in the point groups and an estimation plane on which the marker is positioned.

2. The method of estimating the attitude of the camera according to claim 1, wherein the step of extracting the localized feature points for calculating the attitude of the camera is a step of extracting, from respective images k included in an image collection $\Phi$, $I_k$-pieces of the feature points obtained based on a three-dimensional position $M_k$ and a descriptor $D_k$ calculated based on formulae of $$M_k = \{m_i^k | i=1, \ldots, J_k\}, m_i^k = [m_{x,i}^k, m_{y,i}^k, m_{z,i}^k]^T$$

$$D_k = \{d_i^k | i=1, \ldots, J_k\};$$

the step of performing the association between the extracted feature points, one-to-one between the frames, is a step of performing the association between the feature point I included in the image k included in the image collection $\Phi$ and the feature point j included in the image h and calculated according to a formula of $$\Psi = \{i,j,k,h) | D(d_i^k, d_j^h) < \text{threshold}, i \in D_k, j \in D_h, k \neq h, k \in \Phi, h \in \Phi\}$$

in cases where a distance between the descriptors is less than a threshold; and the step of estimating the approximate attitude of the camera is a step of estimating an attitude of the camera $(R_c^k, t_c^k)$ which minimizes an estimation function $E_I$ defined by formulae of $$E_I = \sum_{(k,h,i,j) \in \Psi} (\varepsilon_{ij}^{kh})^T (\varepsilon_{ij}^{kh})$$

$$\varepsilon_{ij}^{kh} = \begin{bmatrix} \varepsilon_{x,ij}^{kh} \\ \varepsilon_{y,ij}^{kh} \\ \varepsilon_{z,ij}^{kh} \end{bmatrix} = v_i^k - v_j^h$$

$$v_i^k = R_C^k m_i^k + t_C^k.$$

3. The method of estimating the attitude of the camera according to claim 2, wherein the step of predicting the approximate position of the marker is calculating a representative position $W^r$ of the marker from coordinates $(R_M^r, t_M^r)$ which minimizes an estimation function $E_M^r$ defined by formulae of $$E_M^r = \sum_k \sum_\lambda (e_\lambda^{k,r})^T (e_\lambda^{k,r})$$

$$e_\lambda^{k,r} = (R_C^k q_\lambda^{k,r} + t_C^k) - (R_M^r \bar{q}_\lambda + t_M^r)$$

$$W^r = \{R_M^r \bar{q}_\lambda + t_M^r | \lambda = 1, \ldots, 4\},$$

where a collection $\Xi$ of R-pieces of markers which are present in an imaging environment is defined as $$\Xi = \{1, \ldots, R\},$$

coordinates $Q^{k,r}$ of four apexes of a rectangular marker r detected in the image k are defined as $$Q^{k,r} = \{q_\lambda^{k,r} | \lambda = 1, \ldots, 4\}$$

$$q_\lambda^{k,r} = [q_{x,\lambda}^{k,r}, q_{y,\lambda}^{k,r}, q_{z,\lambda}^{k,r}]^T,$$

and the coordinates of the apexes of the marker are assumed as being defined by formulae of $$\bar{q}_1 = [-\theta, 0, \theta]^T$$

$$\bar{q}_2 = [-\theta, 0, -\theta]^T$$

$$\bar{q}_3 = [\theta, 0, -\theta]^T$$

$$\bar{q}_4 = [\theta, 0, \theta]^T,$$

where the marker has a true shape shown by a marker model, the marker model having a rectangular size expressed as $2\theta$.

4. The method of estimating the attitude of the camera according to claim 3, wherein the step of extracting the point groups within the predetermined distance from the predicted approximate position of the marker includes steps of determining all three-dimensional points $h_m^k$ included in the depth image $Y_k$ of the image k, based on a formula of $$h_m^k = [h_{x,m}^k, h_{y,m}^k, h_{z,m}^k]^T m \in Y_k,$$

determining, using the approximate attitude of the camera, a point $f_m^k$ based on a formula of $$f_m^k = R_C^k h_m^k + t_C^k,$$

where the point $f_m^k$ is a point obtained by converting the three-dimensional point $h_m^k$ of the depth image of the image k to a three-dimensional point in a world coordinate system, and determining a collection according to a formula of $$\Omega = \{(k,m,r) | b(f_m^k, W^r) = \text{true}, f_m^k = R_C^k h_m^k + t_C^k, m \in Y_k, r \in \Xi, k \in \Phi\},$$

through extracting, as a point belonging to the point groups, the point $f_m^k$ which is near the marker.

5. The method of estimating the attitude of the camera according to claim 4, wherein the step of re-estimating the attitude of the camera during imaging of the specified frame includes defining an estimation function $E_F$ of based on a formula of $$E_F = \sum_{(k,h,i,j) \in \Psi} (\varepsilon_{ij}^{kh})^T (\varepsilon_{ij}^{kh}) + \eta \sum_{(k,r,m) \in \Omega} (\delta_m^{k,r})^2$$

$$v_i^k = R^k m_i^k + t^k$$

$$\delta_m^{k,r} = -n_r^T (R^k h_m^k + t^k) - d_r,$$

(where $(n_r^T, d_r)$ is a parameter indicating a plane to which the point groups near the marker belong), and estimating the attitude of the camera, ($R^k$, $t^k$), which minimizes the estimation function $E_F$.

6. A system for estimating an attitude of a camera, the system comprising:
a camera that captures images of an actual environment in which a plane marker is arranged, the images including an intensity image and a depth image; and
a computer that comprises a calculation unit, wherein
the calculating unit performs steps of:
collecting information about images captured by the camera in an environment in which a planar marker is disposed;
determining a position of the planar marker from images in which the planar marker is captured without occlusion;
extracting localized feature points for calculating the attitude of the camera for each frame from the intensity image and the depth image of each frame acquired by imaging;
performing association between the extracted feature points, one-to-one between frames, based on a distance between descriptors:
estimating an approximate attitude of the camera during imaging of a specified frame in which a marker hidden by an occlusion is captured, based on the association between the feature points;
predicting an approximate position of the marker in relation to the specified frame based on the position of the marker and the approximate camera attitude;
extracting point groups within a predetermined distance from the predicted approximate position of the marker, through converting a three-dimensional point included in the depth image of the specified frame to a world coordinate system using the approximate attitude of the camera; and
re-estimating the attitude of the camera during imaging of the specified frame by determining a camera attitude that optimizes an evaluation function conditioning a distance between a marker neighboring point included in the joint groups and an estimation plane on which the marker is positioned.

7. A system comprising:
a camera that captures images of an actual environment in which a plane marker is arranged, the images including an intensity image and a depth image;
means for collecting information about images captured by the camera in an environment in which a planar marker is disposed;
means for determining a position of the planar marker from images in which the planar marker is captured without occlusion;
means for extracting localized feature points for calculating the attitude of the camera for each frame from the intensity image and the depth image of each frame acquired by imaging;
means for performing association between the extracted feature points, one-to-one between frames, based on a distance between descriptors;
means for estimating an approximate attitude of the camera during imaging of a specified frame in which a marker hidden by an occlusion is captured, based on the association between the feature points;
means for predicting an approximate position of the marker in relation to the specified frame based on the position of the marker and the approximate camera attitude;
means for extracting point groups within a predetermined distance from the predicted approximate position of the marker, through converting a three-dimensional point included in the depth image of the specified frame to a world coordinate system using the approximate attitude of the camera; and
means for re-estimating the attitude of the camera during imaging of the specified frame by determining a camera attitude that optimizes an evaluation function conditioning a distance between a marker neighboring point included in the point groups and an estimation plane on which the marker is positioned.

\* \* \* \* \*